(12) United States Patent
Hasler

(10) Patent No.: US 6,321,538 B2
(45) Date of Patent: Nov. 27, 2001

(54) METHOD OF INCREASING A FLOW RATE OF INTAKE AIR TO AN ENGINE

(75) Inventor: Gregory S. Hasler, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/767,628

(22) Filed: Jan. 23, 2001

Related U.S. Application Data

(62) Division of application No. 09/334,342, filed on Jun. 16, 1999, now Pat. No. 6,205,786.

(51) Int. Cl.$^7$ ............................................... F02B 37/04
(52) U.S. Cl. ................................................... 60/612
(58) Field of Search ............................ 60/609, 610, 612; 123/478

(56) References Cited

U.S. PATENT DOCUMENTS

| | | | |
|---|---|---|---|
| 3,933,135 | * | 1/1976 | Zillman et al. ....................... 123/478 |
| 5,704,323 | * | 1/1998 | Gardell et al. ....................... 60/612 |
| 6,029,452 | * | 2/2000 | Halimi et al. ....................... 60/612 |
| 6,062,026 | * | 5/2000 | Woollenweber et al. ............. 60/612 |

FOREIGN PATENT DOCUMENTS 60-212621 * 10/1985 (JP) .................................... 60/612

* cited by examiner

Primary Examiner—Michael Koczo
(74) Attorney, Agent, or Firm—Larry G. Cain

(57) ABSTRACT

Past air intake systems have failed to effectively and efficiently utilize the arrangement of structural components to increase boost at low engine speeds. The present air intake system effectively and efficiently utilizes the arrangement of structural components to increase boost at low engine speeds. The air intake system directs intake air through a turbocharger and evaluates the quantity of flow of intake air to the engine as compared to the flow of fuel. And, depending on the results of the evaluation, a directional control valve directs the flow of intake air to a supercharger or to the engine. The supercharger is driven by a motor having a variable rate of speed as compared to the engine.

9 Claims, 1 Drawing Sheet

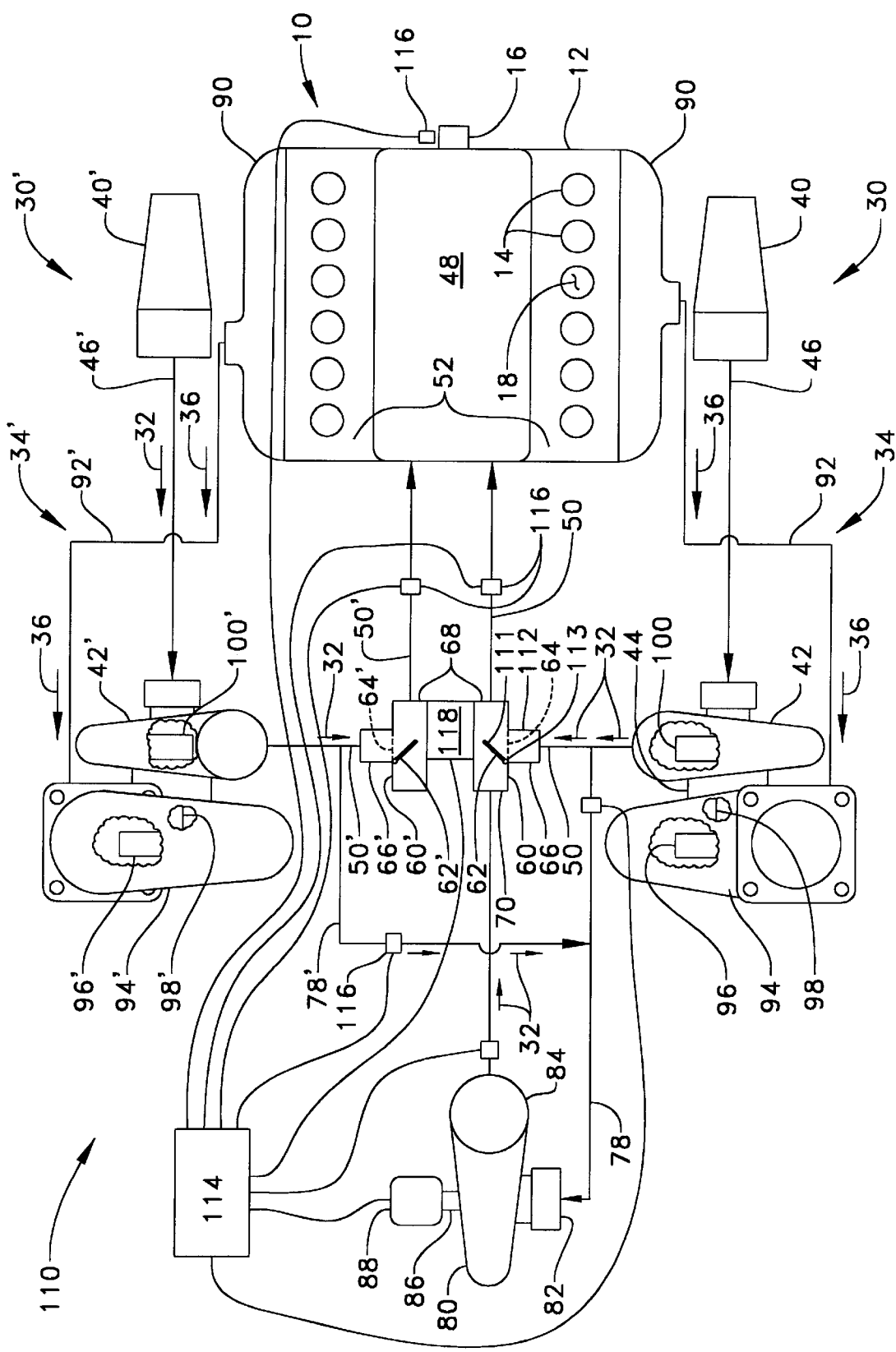

METHOD OF INCREASING A FLOW RATE OF INTAKE AIR TO AN ENGINE

This application is a division of Ser. No. 09/334,342 filed Jun. 16, 1999 U.S. Pat. No. 6,205,786 B1 issued Mar. 27, 2001.

TECHNICAL FIELD

This invention relates generally to an engine and more particularly to an engine having a turbocharger and a supercharger.

BACKGROUND ART

Attempts have been made to provide an efficient and effective intake air supply system for engines. One such example, utilizes a turbocharger or twin turbochargers to increase the intake air supply to the engine increasing boost pressure and increasing output power. Thus, an exhaust gas from the engine which would be spent to the atmosphere is used by recovering the heat within the exhaust to drive a turbine, increasing efficiency. With the engine operating at or near high speed, an adequate supply of exhaust is available to drive the turbocharger and produce an efficient and effective air supply system for engines. However, at low speed sufficient exhaust to drive the turbocharger and produce an adequate supply of intake air is not available. Thus, the efficiency and effectiveness of the turbocharger is lost.

Other attempts have been made to provide and efficient and effective intake air supply for engines by incorporating a supercharger or blower. In these applications, a supercharger or blower is mechanically driven by the engine such as by a belt connected to a pulley on a crankshaft or by a gear or plurality of gears driven by the engine. With these systems, the low speed engine efficiency and effectiveness can be overcome by having a fixed speed ratio between the engine and the supercharger. For example, the speed of the supercharger can be 2 or 3 times that of the engine speed. Thus, the output of the supercharger at low engine speed can deliver adequate intake air for efficient and effective engine operation at low speed. The major disadvantage of using the supercharger is that power of the engine is used to drive the supercharger and can not be deliver as output power.

Attempts have also been made to combine the turbocharger system and the supercharger system. An example of one such system is disclosed in U.S. Pat. No. 4,903,488 issued to Noriyoshi Shibata on Feb. 27, 1990. The patent discloses a multiple compressed air supply system. A turbocharger is driven by an exhaust from an engine and a supercharger is drivingly connected to the engine by a belt and is driven by a crankshaft. The supercharger is driven at a constant speed relative to an engine speed. Thus, the effectiveness and efficiency of each system can be combined. However, with the system as disclosed, the efficiency and the effectiveness of the engine can be further improved.

The present invention is directed to overcoming one or more of the problems as set forth above.

SUMMARY OF THE INVENTION

In one aspect of the invention, an engine has a plurality of operating speeds. One of the plurality of the operating speeds being a low speed and another of the plurality of the operating speeds being a high speed. An air induction system defines a flow of intake air therein and an exhaust system defines a flow of exhaust gas therein. The air induction system is comprised of a turbocharger having a turbine section defining a turbine being driven by the flow of exhaust gas. A shaft is attached to the turbine and drives a compressor wheel. The compressor wheel compresses the flow of intake air and densifies the flow of intake air. A directional control valve has an outlet end, an inlet end being in fluid communication with the flow of intake air being compressed and densified by the compressor wheel and a second inlet end. The directional control valve is movable between an open position and a closed position. The flow of intake air enters the inlet end with the directional control valve in the open position. And, the flow of intake air is prevented from entering the inlet end with the directional control valve in the closed position. A supercharger has an inlet end and an outlet end. The inlet end is in fluid communication with the flow of intake air. The flow of intake air is compressed and densified by the turbocharger prior to being communicated to the supercharger. And, the supercharger further compresses and densifies the intake air prior to exiting said outlet end. The outlet end is in fluid communication with the second inlet end of the direction control valve. And, with the directional control valve in the closed position the intake air is in fluid communication with the outlet end of the directional control valve. A motor is drivingly connected to the supercharger. The motor has a variable rate of speed and the variable rate of speed varies a quantity of flow of the intake air from the supercharger to the engine.

In another aspect of the invention, an engine has a plurality of operating speeds. One of the plurality of the operating speeds is a low speed and another of the plurality of the operating speeds is a high speed. An air induction system defines a flow of intake air therein and an exhaust system defines a flow of exhaust gas therein. The air induction system is comprised of a plurality of turbochargers, each having a turbine section defining a turbine being driven by the flow of exhaust gas. A shaft is attached to the turbine and drives a compressor wheel. The compressor wheel compresses the flow of intake air and densifies the flow of intake air. A plurality of directional control valves each have an outlet end, an inlet end being in fluid communication with the flow of intake air being compressed and densified by the compressor wheel. And, at least one of the plurality of directional control valves has a second inlet end. The plurality of directional control valves are movable between an open position and a closed position. The flow of intake air enters the inlet end of a respective one of the plurality of directional control valves with the plurality of directional control valves in the open position. The flow of intake air is prevented from entering the inlet end with the plurality of directional control valves in the closed position. A supercharger has an inlet end and an outlet end. The inlet end is in fluid communication with the flow of intake air. The flow of intake air is compressed and densified by the plurality of turbochargers prior to being communicated to the supercharger. And, the supercharger further compresses and densifies the intake air prior to exiting the outlet end. The outlet end is in fluid communication with the second inlet end of the at least one of the plurality of directional control valves. With the plurality of directional control valves in the closed position, the intake air is in fluid communication with the outlet end of the plurality of directional control valves. A motor is drivingly connected to the supercharger. The motor has a variable rate of speed. The variable rate of speed varies a quantity of flow of the intake air from the supercharger.

In another aspect of the invention, a method of increasing a flow of intake air to an engine is disclosed. The engine defines a plurality of speeds, one of the plurality of speeds being a low speed and another of the plurality of speeds being a high speed. The engine further includes at least a turbocharger. Increasing the flow of intake air to the engine comprises the following steps. Directing the flow of intake air to a turbocharger. Compressing and densifying the flow of intake air within the turbocharger. Monitoring the flow of intake air to the engine. Monitoring a quantity of fuel to the engine. Calculating a proportional relationship of the quantity of fuel to the flow of intake air. Directing the flow of intake air from the turbocharger to at least one of a directional control valve and a supercharger. Driving the supercharger with a motor. Compressing and densifying the flow of intake air further within the supercharger. And, directing the compressed and densified flow of intake air through the directional control valve prior to directing the increased flow of intake air to the engine.

BRIEF DESCRIPTION OF THE DRAWINGS

FIG. 1 is a schematic view of an engine embodying the present invention.

BEST MODE FOR CARRYING OUT THE INVENTION

Referring to FIG. 1, an engine 10 includes a block 12 having a plurality of bores 14 therein. A crankshaft 16 is rotatably positioned in the block 12 in a conventional manner and operatively moves a piston 18 within each of the plurality of bores 14. The engine 10 includes a first air induction system 30 through which a flow of intake air, designated by arrow 32 is operatively connected to the plurality of bores 14. And, the engine 10 includes an exhaust system 34 through which a flow of exhaust gas, designated by arrow 36 is operatively connected to the plurality of bores 14.

The air induction system 30 includes an air cleaner 40 being in communication with atmospheric air. The air cleaner 40 can be of any conventional design and as an alternative could include an oil separator. The air cleaner 40 is fluidly connected with a compressor section 42 of a turbocharger 44. In this application, a first tube 46 is interposed between the air cleaner 40 and the compressor section 42. The compressor section 42 is fluidly connected to an aftercooler 48. A second tube 50 is interposed between the compressor section 42 and the aftercooler 48. The aftercooler 48 is fluidly connected to an intake manifold 52. In this application, the aftercooler 48 is formed of a tube type configuration. But, as an alternative other configuration, such as, a primary surface or fin type configuration could be used without varying from the gist of the invention. The intake manifold 52 is attached to the engine 10 in a conventional manner and is operatively connected to the plurality of bores 14.

A directional control valve 60 is positioned in the second tube 50. The directional control valve 60 is movable between an open position 62 and a closed position 64, shown in phantom. The directional control valve 60 is infinitely movable between the open position 62 and the closed position 64. A first inlet end 66 of the directional control valve 60 is operatively positioned in communication with the flow of intake air 32 exiting the compressor section 42. And, an outlet end 68 of the directional control valve 60 is operatively positioned in communication with the flow of intake air 32 going to the aftercooler 48. The directional control valve 60 further includes a through inlet end 70, being in communication with the outlet end 68 as will be explained later.

Interposed between a portion of the second tube 50 between the compressor section 42 and the directional control valve 60 is a first conduit 78 being in fluid communication with a supercharger 80. The supercharger 80 has an inlet end 82 being connected with the first conduit 78 and an outlet end 84 being in fluid communication with the through inlet end 70 of the directional control valve 60. The supercharger 80 is attached to a shaft 86 of a hydraulic motor 88 being operable through a variable rate of speed. As an alternative, the shaft 86 could be driven by any type of a motor such as an electric motor without changing the gist of the invention. The hydraulic motor 88 is driven in a conventional manner, not shown. Additionally, as a further alternative, the shaft 86 of the supercharger 80 can be driven mechanically such as by a belt or gear.

The exhaust system 34 includes an exhaust manifold 90 being in communication with the plurality of bores 14 in a conventional manner. An exhaust pipe 92 is in fluid communication with the exhaust manifold 90 and a turbine section 94 of the turbocharger 44. A turbine 96 within the turbine section 94 is attached to a shaft 98 and drives a compressor wheel 100 of the compressor sectiqn 42 in a conventional manner.

Another embodiment is also shown in FIG. 1. In this embodiment, additional elements of a like feature have been added and are designated by a "'" number. For example, a second air induction system 30' has been substantially added or incorporated with the air induction system 30. The second air induction system 30' includes a second air cleaner 40' being in communication with atmospheric air. The second air cleaner 40' can be of any conventional design and as an alternative could include an oil separator. The second air cleaner 40' is fluidly connected with a compressor section 42' of a second turbocharger 44. In this embodiment, a first tube 46' is interposed between the second air cleaner 40' and the compressor section 42 ' of the second turbocharger 44'. The compressor section 42' is fluidly connected to the aftercooler 48. A second tube 50' is interposed between the compressor section 42' of the second turbocharger 44' and the aftercooler 48. The aftercooler 48 is fluidly connected to the intake manifold 52.

A second directional control valve 60' is positioned in the second tube 50'. The second directional control valve 60' is movable between an open position 62' and a closed position 64', shown in phantom. The directional control valve 60' is infinitely movable between the open position 62' and the closed position 64'. A first inlet end 66' of the second directional control valve 60' is operatively positioned in communication with the flow of intake air 32 exiting the compressor section 42'. And, an outlet end 68' of the second directional control valve 60' is operatively positioned in communication with the flow of intake air 32 going to the aftercooler 48. The second directional control valve 60' further includes a through inlet end 70', which in this embodiment is not used.

Interposed between a portion of the second tube 50' between the compressor section 42' and the second directional control valve 60' is a first conduit 78' being in fluid communication with the supercharger 80. In this application, the first conduit 78' of the second air induction system 30' is connected with the first conduit 78 of the air induction system 30 and to the inlet end 82 of the supercharger 80. The outlet end 84 of the supercharger 80 is in fluid communication with the through inlet end 70 of the directional control valve 60 of the air induction system 30.

A second exhaust system 34' includes the exhaust manifold 90 and an exhaust pipe 92' being in fluid communication with the exhaust manifold 90 and a turbine section 94' of the second turbocharger 44'. A turbine 96' within the turbine section 94' is attached to a shaft 98' and drives a compressor wheel 100' of the compressor section 42' in a conventional manner.

Each of the first air induction system 30 and the second air induction system 30' have a control system 110 connected thereto. In one example, the control system 110 is mechanical. For example, each of the direction control valves 60 includes a flapper 111 being rotatably positioned within a housing 112 and having a spring mechanism 113 biasing the flapper toward the closed position 64.

In another embodiment the control system 110 includes a controller 114 which can be used with either or both of the first air induction system 30 and the second air induction system 30'. Additionally, a plurality of sensors 116 are positioned within or on the engine 10 and/or the intake air flow 32. A portion of the plurality of sensors 116 monitor the pressure and flow rate. Another one of the plurality of sensors 116 monitors speed of the crankshaft 16. Another one of the plurality of sensors 116 monitors the quantity of fuel being injected to the plurality of bores 14 or the engine 10. A signal is sent from each of the sensors 116 to the controller 114, interpreted by the controller and a signal is sent to a positioning mechanism 118. The positioning mechanism 118 is connected to the direction control valve 60 and controls the position of the direction control valve 60 between the open position 62 and the closed position 64. And, when the first air induction system and the second air induction system are used in combination, the positioning mechanism 118 is connected to the directional control valve 60 and the second directional control valve 60'. The positioning mechanism 118 controls the operative positions between the open position 62,62' and closed position 64,64' respectively. The positioning mechanism 118 can be of any configuration such as mechanical, electrical or hydraulic. In this application, the positioning mechanism is electrical, such as a solenoid. Additionally, the controller 114, depending on the interpretation of the signals from the plurality of sensors varies the speed of the shaft 86 driving the supercharger 80. Controlling the speed of the shaft 86 can be done in a variety of manners, in this application a hydroelectric server system, not shown, is used.

INDUSTRIAL APPLICABILITY

In use, the engine 10 is started in a conventional manner and is brought up to an operating speed and temperature. Fuel, from an external source, is supplied to each of the plurality of bores 14. Intake air 32 is supplied to the engine 10. For example, intake air 32 enters through the air cleaner 40 and passes through the first tube 46 to the compressor section 42 and is compressed by the compressor wheel 100 increasing in pressure and temperature. From the compressor section 42, intake air 32 passes through the aftercooler 48, is cooled becoming more dense and enters into the respective one of the plurality of bores 14. Within the plurality of bores 14 the intake air 32 and the fuel are combusted. After combustion, the flow of exhaust gas 36 enters the exhaust manifold 90. The flow of exhaust gas 36 passes through the exhaust pipe 92 and enters the turbine section 94 of the turbocharger 44 and drives the shaft 98 driving the compressor wheel 100. After flowing through the turbine section 94 of the turbocharger 44, the exhaust gas 36 exits through a muffler to the atmosphere in a conventional manner.

With the engine 10 operating at low speed, a need is defined to accelerate the engine to a high speed. Additional fuel is directed to the plurality of bores 14 in a conventional manner. The time required for the quantity of intake air 32 needed to efficiently and effectively accelerate the engine 10 is lacking with only the turbocharger 44 being used. For example, since the flow of exhaust 36 from the plurality of bores 14 is low or small in quantity the speed and the compressibility preformed by the turbocharger 44 is low or small resulting in a low quantity of intake air 32. Thus, to increase the quantity of intake air 32 proportionally with the quantity of fuel the supercharger 80 is activated.

For example, with the control system 110 being mechanical, the spring mechanism 113 acts to bias the directional control valves 60 into the closed position 64. As the flow of intake air 32 increases in pressure from the turbocharger 44,44' the flapper 111 is acted on and the position of the directional control valve 60,60' is moved toward the open position 62,62'. The greater the quantity of the pressure, the more the position of the directional control valve 60,60' is moved toward the open position. As the pressure between the turbocharger 44,44' and the supercharger 80 is balanced to a predetermined level, the flow of intake air 32 to the supercharger is stopped.

For example, with the control system 110 including the controller 114, the directional control valve 60 is moved to the closed position 64 and the flow of intake air 32 from the turbocharger 44 passes along the first conduit 78 to the supercharger 80. The quantity of intake air 32 passing to the aftercooler 48 is monitored and a signal is sent to the controller 114. Depending on the signal, the speed of the shaft 86 driving the supercharger 80 is regulated. For example, if the quantity of intake air 32 is low and the quantity of fuel is high the speed of the shaft 86 is increased to a maximum. This results in increasing the quantity of intake air 32 passing through the through inlet end 70 of the directional control valve 60 and to the aftercooler 48. As the quantity of intake air 32 increases, the speed of the shaft 86 is decreased, the position of the directional control valve 60 is moved toward the open position 62. With the directional control valve 60 at the open position 62 little if any flow of intake air 32 is directed to the supercharger 80. Additionally, the motor 88 can be stopped. And, the efficiency and effectiveness of the system 30 is increased. The combination accelerates the engine 10 from a slow speed to a high speed effectively, efficiently and with reduced emissions.

When using the combination of the first air induction system 30 and the second air induction system 30', the operation is slightly different. For example, with the engine 10 operating at low speed, a need is defined to accelerate the engine to a high speed. Again, additional fuel is directed to the plurality of bores 14 in a conventional manner. The time required for the quantity of intake air 32 needed to efficiently and effectively accelerate the engine 10 is lacking with only the turbochargers 44,44' being used. Since the flow of exhaust 36 from the plurality of bores 14 is low or small in quantity, the speed and the compressibility preformed by the turbochargers 44,44' is low or small resulting in a low quantity of intake air 32. Thus, to increase the quantity of intake air 32 proportionally with the quantity of fuel the supercharger 80 is activated. In this application, a single supercharger 80 is used to receive the flow of intake air 32 from each of the turbochargers 44,44'. The directional control valve 60 and the second directional control valve 60' are moved to the closed position 64,64' and the flow of intake air 32 from the turbochargers 44,44' passes along the first conduit 78,78' to the supercharger 80. The quantity of intake air 32 passing to the aftercooler 48 is monitored and a signal is sent to the controller 114. Depending on the signal, the speed of the shaft 86 driving the supercharger 80 is regulated. For example, if the quantity of intake air 32 is low and the quantity of fuel is high the speed of the shaft 86 is increased to a maximum. This results in increasing the quantity of intake air 32 passing through the through inlet end 70 of the directional control valve 60 and to the aftercooler 48. As the quantity of intake air 32 increases, the speed of the shaft 86 is decreased. The position of the directional control valve 60 and the second directional control valve 60' are moved toward the open position 62,62'. With the directional control valve 60 and the second directional valve 60' at the open position 62,62' little if any flow of intake air 32 is directed to the supercharger 80. Additionally, the motor 88 can be stopped. And, the efficiency and effectiveness of the air induction system 30 and the second air induction system 30' is increased. The combination accelerates the engine 10 from a slow speed to a high speed effectively, efficiently and with reduced emissions.

The efficiency and effectiveness of the first air induction system 30 and the second air induction system 30' is superior to that of other systems. For example, with the turbochargers 44,44' operating by exhaust gas 36 the energy therein is used to partially compress and densifies the intake air 32. Thus, the intake air 32 had been partially compressed and densified by each of the turbochargers 44,44' prior to the single supercharger 80 further compressing and densifing the intake air 32. Furthermore, the structural arrangement of the intake air 32 flow path is simplified when using a plurality of turbochargers 44,44' and directing the flow of intake air 32 through a single directional valve 60,60'.

Other aspects objects and advantages of this invention cam be obtained from a study of the drawings, the disclosure and the appended claims.

What is claimed is:

1. A method of increasing a flow rate of a flow of intake air to an engine, said engine defining a plurality of speeds, one of said plurality of speeds being a low speed and another of said plurality of speeds being a high speed, said engine further including at least a turbocharger, said steps of increasing said flow rate of intake air to said engine comprising;

directing said flow of intake air to a turbocharger;
compressing and densifying said flow of intake air within said turbocharger;
monitoring said flow rate of intake air to said engine;
monitoring a quantity of fuel to said engine;
calculating a proportional relationship of said quantity of fuel to said flow rate of intake air;
directing said flow of intake air from said turbocharger to at least one of a directional control valve and a supercharger depending on said calculating said proportional relationship;
driving said supercharger with a motor;
compressing and densifying said flow of intake air having passed through said turbocharger further within said supercharger; and
directing said compressed and densified flow of intake air from said supercharger through said directional control valve prior to directing said increased flow of intake air to said engine.

2. The method of increasing said flow rate of intake air to said engine of claim 1 wherein said step of driving said supercharger with a motor includes said motor having the capability of being driven at a variable rate of speed as compared to a rate of speed of said engine.

3. The method of increasing said flow rate of intake air to said engine of claim 1 wherein said step of directing said flow of intake air from said turbocharger to at least one of a directional control valve and a supercharger includes said directional control valve having a second directional control valve being positioned in a closed position and said flow of intake air being directed to said supercharger.

4. The method of increasing said flow rate of intake air to said engine of claim 3 wherein said step of directing said flow of intake air from said turbocharger to at least one of a directional control valve and a supercharger includes said flow of intake air after being compressed and densified by said supercharger passing through one of said directional control valve and said second directional control valve prior to entering said engine.

5. The method of increasing said flow rate of intake air to said engine of claim 1 wherein said step of directing said flow of intake air to a turbocharger includes a pair of turbochargers.

6. A method of increasing a flow rate of a flow of intake air to an engine, said engine defining a plurality of speeds, one of said plurality of speeds being a low speed and another of said plurality of speeds being a high speed, said engine further including at least a turbocharger, said steps of increasing said flow rate of intake air to said engine comprising;

directing said flow of intake air to a pair of turbochargers;
compressing and densifying said flow of intake air within said turbocharger;
monitoring said flow rate of intake air to said engine;
monitoring a quantity of fuel to said engine;
calculating a proportional relationship of said quantity of fuel to said flow rate of intake air;
directing said flow of intake air from said turbocharger to at least one of a directional control valve and a supercharger depending on said calculating said proportional relationship;
driving said supercharger with a motor;
compressing and densifying said flow of intake air having passed through said turbocharger further within said supercharger; and
directing said compressed and densified flow of intake air from said supercharger through said directional control valve prior to directing said increased flow of intake air to said engine.

7. The method of increasing said flow rate of intake air to said engine of claim 6 wherein said step of directing said flow of intake air from said turbocharger to at least one of a directional control valve and a supercharger includes said directional control valve having a second directional control valve being positioned in a closed position and said flow of intake air being directed to said supercharger.

8. The method of increasing said flow rate of intake air to said engine of claim 7 wherein said step of directing said flow of intake air from said turbocharger to at least one of a directional control valve and a supercharger includes said flow of intake air after being compressed and densified by said supercharger passing through one of said directional control valve and said second directional control valve prior to entering said engine.

9. The method of increasing said flow rate of intake air to said engine of claim 6 wherein said step of driving said supercharger with a motor includes said motor having the capability of being driven at a variable rate of speed as compared to a rate of speed of said engine.

* * * * *